(12) United States Patent
Kagata et al.

(10) Patent No.: US 8,158,697 B2
(45) Date of Patent: Apr. 17, 2012

(54) INK COMPOSITION, RECORDED MATERIAL, RECORDING METHOD, AND RECORDING APPARATUS

(75) Inventors: Takayoshi Kagata, Shiojiri (JP); Tsuyoshi Sano, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 301 days.

(21) Appl. No.: 12/509,650

(22) Filed: Jul. 27, 2009

(65) Prior Publication Data

US 2010/0028625 A1 Feb. 4, 2010

(30) Foreign Application Priority Data

Jul. 31, 2008 (JP) ................................. 2008-197485
Oct. 24, 2008 (JP) ................................. 2008-273988

(51) Int. Cl.
*C09D 11/10* (2006.01)

(52) U.S. Cl. ........ 523/160; 523/161; 524/507; 524/590; 524/871

(58) Field of Classification Search .................. 524/871, 524/507, 590; 525/453; 523/160, 161
See application file for complete search history.

(56) References Cited

U.S. PATENT DOCUMENTS

| | | | |
|---|---|---|---|
| 4,880,465 A | 11/1989 | Loria et al. | |
| 7,217,743 B2 | 5/2007 | Kondo | |
| 2003/0149130 A1 | 8/2003 | Kondo | |
| 2007/0191509 A1 | 8/2007 | Kobayashi | |
| 2007/0242118 A1* | 10/2007 | Koganehira et al. | 347/100 |
| 2008/0097005 A1 | 4/2008 | Shiotani | |

FOREIGN PATENT DOCUMENTS

| | | |
|---|---|---|
| EP | 1 536 057 A1 | 6/2005 |
| GB | 2 224 737 | 5/1990 |
| JP | 2000-1639 | 1/2000 |
| JP | 2000-103995 A | 4/2000 |
| JP | 2000-239585 A | 9/2000 |
| JP | 2007-211176 A | 8/2002 |
| JP | 2003-183551 A | 7/2003 |
| JP | 2004-59627 A | 2/2004 |
| JP | 2005-290044 | 10/2005 |
| JP | 2005-325190 | 11/2005 |
| JP | 2006-56990 A | 3/2006 |
| JP | 2007-231191 | 9/2007 |
| WO | 2007/100121 A1 | 9/2007 |

OTHER PUBLICATIONS

Search Reports of EPO Application No. 09166785.7 Issued Dec. 18, 2009 and Mar. 4, 2010.
Machine Translation of Japanese Application 2007-231191 Published Sep. 13, 2007.
Machine Translation of Japanese Application 2005-290044 Published Oct. 20, 2005.
Machine Translation of Japanese Application 2005-325190 Published Nov. 24, 2005.
Machine Translation of Japanese Application 2000-1639 Published Jan. 7, 2000.
English Abstract of Japanese Application No. 2000-103995A Published Apr. 11, 2000.
English Abstract of Japanese Application No. 2000-239585 A Published Sep. 5, 2000.

* cited by examiner

*Primary Examiner* — David W Wu
*Assistant Examiner* — Vu A Nguyen
(74) *Attorney, Agent, or Firm* — Ladas & Parry LLP

(57) ABSTRACT

An ink composition includes a polyurethane resin and at least one selected from a metal compound and hollow resin particles as a colorant, and in the ink composition described above, the polyurethane resin is a polycarbonate-based or a polyether-based anionic polyurethane resin.

20 Claims, No Drawings

INK COMPOSITION, RECORDED MATERIAL, RECORDING METHOD, AND RECORDING APPARATUS

BACKGROUND

1. Technical Field

The present invention relates to an ink composition, a recorded material using the same, a recording method, and a recording apparatus.

2. Related Art

Heretofore, as a white colorant, a white ink composition including hollow polymer fine particles has been known (for example, see U.S. Pat. No. 4,880,465). The hollow polymer fine particles each have a cavity therein and an outer shell formed of a liquid permeable resin. By the structure described above, since the inside cavities of the hollow resin particles are filled with a solvent in the ink composition, the specific gravity of the hollow resin particles and that of the ink composition are made substantially equal to each other, and hence the hollow resin particles can be stably dispersed in the ink composition. In addition, when an image is formed on a recording medium using this ink composition, since the solvent inside the cavities of the hollow resin particles is replaced with air in drying, the hollow resin particles have a shielding effect by light scattering generated by the difference in refractive index between the outer shell and the cavity of each particle (that is, a white color is exhibited). In general, the hollow resin particle itself is formed of a transparent resin, such as an acrylic resin. In addition, as the white colorant, a white ink composition including a metal oxide has also been known.

However, the above white ink composition is inferior in terms of fixability on a recording medium and hence is not sufficient in terms of rub-off resistance.

In addition, techniques to improve jet stability and storage stability of a white ink composition or a color ink composition have been disclosed, for example, in Japanese Unexamined Patent Application Publication Nos. 2000-103995, 2000-239585, and 2006-56990. However, all the techniques described above still have room for improvement in terms of rub-off resistance and printing characteristics.

SUMMARY

An advantage of some aspects of the invention is to provide an ink composition that has superior rub-off resistance and that is suitably applied, in particular, to an ink-jet recording system.

The invention is as follows.

(1) An ink composition that includes a polyurethane resin and at least one selected from a metal compound and hollow resin particles as a colorant, in which the polyurethane resin is a polycarbonate-based or a polyether-based anionic polyurethane resin.

(2) In the ink composition disclosed in the above (1), the hollow resin particles are used as the colorant.

(3) In the ink composition disclosed in the above (1) or (2), the polyurethane resin is dispersed in the form of particles in a solvent.

(4) In the ink composition disclosed in one of the above (1) to (3), the polyurethane resin is in the form of a self-emulsification type dispersion.

(5) In the ink composition disclosed in one of the above (1) to (4), the content of the polyurethane resin is 0.5 to 10 percent by mass.

(6) In the ink composition disclosed in one of the above (1) to (5), the hollow resin particles have an average particle diameter of 0.2 to 1.0 μm.

(7) In the ink composition disclosed in one of the above (1) to (6), the content of the hollow resin particles is 5 to 20 percent by mass.

(8) In the ink composition disclosed in one of the above (1) to (7), at least one selected from an alkanediol and a glycol ether is further included.

(9) In the ink composition disclosed in one of the above (1) to (8), an acetylene glycol-based surfactant or a polysiloxane-based surfactant is further included.

(10) The ink composition disclosed in one of the above (1) to (9) is applied to an ink-jet recording system.

(11) A recorded material that has an image formed by the ink composition disclosed in one of the above (1) to (10).

(12) A recording method that records an image formed by the ink composition disclosed in one of the above (1) to (10).

(13) A recording apparatus that records an image formed by the recording method disclosed in the above (12).

DESCRIPTION OF EXEMPLARY EMBODIMENTS

An ink composition of the invention includes a metal compound or hollow resin particles as a colorant. In particular, since the hollow resin particles used as a colorant have a larger particle diameter than that of the metal compound, such as a metal oxide, which is another colorant, and also have a hollow structure, it has been known that the hollow resin particles are difficult to fix on a recording medium and hence have inferior rub-off resistance. However, according to the invention, since a polyurethane resin having a specific structure is used to fix the colorant as described above, an ink composition that is able to form an image having superior rub-off resistance can be provided.

Furthermore, the ink composition of the invention is also superior in image storage properties. That is, in the case in which an image is formed in combination of an ink composition including hollow resin particles and another ink composition including a moisturizing agent, that is, for example, in the case in which an image is formed in combination of a white ink composition of the invention including hollow resin particles and a color ink composition which is other than white and which includes a moisturizing agent, even if an obtained recorded material is stored for a long period of time or is held under high humidity conditions, the hollow resin particles are not made transparent, and a high quality image can be maintained for a long period of time.

Hereinafter, the ink composition of the invention will be described in detail. Although the ink composition of the invention is preferably applied to a white ink composition including a metal compound or hollow resin particles as a white colorant, the metal compound and the hollow resin particles may exhibit color other than white, or by using another colorant together with a metal compound and/or hollow resin particles used as a white colorant, the ink composition itself may have color other than white.

Ink Composition

The ink composition of the invention is an ink composition including a polyurethane resin and at least one selected from a metal compound and hollow resin particles as a colorant, and the polyurethane resin is a polycarbonate-based or a polyether-based anionic polyurethane resin.

1. Metal Compound and Hollow Resin Particles

The ink composition of the invention includes at least one selected from a metal compound and hollow resin particles as a colorant.

The metal compound of the invention is not particularly limited as long as it is a metal atom-containing compound usable as a pigment, and a metal oxide, barium sulfate, and calcium carbonate, which have been used as a white pigment, are preferable. The metal oxide is not particularly limited, and for example, titanium dioxide, zinc dioxide, silica, alumina, or magnesium oxide may be mentioned. As the metal compound of the invention, titanium dioxide or alumina is preferably used.

The content of the metal compound is, with respect to the total mass of the ink composition, preferably 1.0 to 20.0 percent by mass and more preferably 5.0 to 10.0 percent by mass. When the content of the metal compound is more than 20.0 percent by mass, for example, clogging of an ink-jet recording head may occur, so that the reliability is degraded in some cases. On the other hand, when the content is less than 1.0 percent by mass, the color density, such as the degree of whiteness, tends to be insufficient.

The average particle diameter (outside diameter) of the metal compound is preferably 30 to 600 nm and more preferably 200 to 400 nm. When the outside diameter is more than 600 nm, for example, the particles may precipitate to disturb the dispersion stability thereof, and clogging of an ink-jet recording head may occur, so that the reliability is degraded in some cases. On the other hand, when the outside diameter is less than 30 nm, the color density, such as the degree of whiteness, tends to be insufficient.

The average particle diameter of the metal compound may be measured by a particle distribution measurement device using a laser diffraction scattering method as a measurement principle. As the laser diffraction particle distribution measurement device, for example, a particle distribution measurement device (for example, "Microtrack UPA" manufactured by Nikkiso Co., Ltd.) using a dynamic light scattering method as a measurement principle may be used.

As the hollow resin particles of the invention, particles each having a cavity inside and an outer shell formed of a liquid permeable resin are preferable. By the structure as described above, when the hollow resin particles are present in an aqueous ink composition, the inside cavities of the particles are filled with an aqueous medium. Since the particles filled with an aqueous medium have a specific density approximately equivalent to that of an aqueous medium outside the particles, the particles can maintain the dispersion stability in the aqueous ink composition without precipitating. Accordingly, the storage stability and the ejection stability of the ink composition can be improved.

In addition, when the ink composition of the invention is ejected on a recording medium, such as paper, the aqueous medium inside the particles evaporates in drying, so that the cavities are filled with air. Since containing air inside, the particles each have the resin layer and the air layer having a different refractive index therefrom and effectively scatter incident light, so that a white color is obtained. In addition, when resin layers that form hollow resin particles are colored while retaining the light transparency, a color different from white can be obtained.

The hollow resin particles used in the invention are not particularly limited, and known particles may be used. For example, hollow resin particles disclosed, for example, in U.S. Pat. No. 4,880,465 and Japanese Patent No. 3,562,754 may be preferably used.

The average particle diameter (outside diameter) of the hollow resin particles is preferably 0.2 to 1.0 μm and more preferably 0.4 to 0.8 μm. When the outside diameter is more than 1.0 μm, for example, the particles may precipitate to disturb the dispersion stability thereof, and clogging of an ink-jet recording head may occur, so that the reliability is degraded in some cases. On the other hand, when the outside diameter is less than 0.2 μm, the color density, such as the degree of whiteness, tends to be insufficient. In addition, an appropriate inside diameter is approximately 0.1 to 0.8 μm.

The average particle diameter of the hollow resin particles may be measured by a particle distribution measurement device using a laser diffraction scattering method as a measurement principle. As the laser diffraction particle distribution measurement device, for example, a particle distribution measurement device (for example, "Microtrack UPA" manufactured by Nikkiso Co., Ltd.) using a dynamic light scattering method as a measurement principle may be used.

The content (solid component) of the hollow resin particles is, with respect to the total mass of the ink composition, preferably 5 to 20 percent by mass and more preferably 8 to 15 percent by mass. When the content (solid component) of the hollow resin particles is more than 20 percent by mass, for example, clogging of an ink-jet recording head may occur, so that the reliability is degraded in some cases. On the other hand, when the content is less than 5 percent by mass, the color density, such as the degree of whiteness, tends to be insufficient.

A method for preparing the hollow resin particles is not particularly limited, and a known method may be used. As the method for preparing hollow resin particles, for example, a so-called emulsion polymerization method may be used in which a vinyl monomer, a surfactant, a polymerization initiator, and an aqueous dispersion medium are heated and stirred in a nitrogen atmosphere to form a hollow resin-particle emulsion.

As the vinyl monomer, a nonionic monoethylene unsaturated monomer may be mentioned, and for example, styrene, vinyltoluene, ethylene, vinyl acetate, vinyl chloride, vinylidene chloride, acrylonitrile, (meth)acrylamide, and (meth)acrylate may be mentioned. As the (meth)acrylate, for example, methyl acrylate, methyl methacrylate, ethyl(meth)acrylate, butyl(meth)acrylate, 2-hydroxyethyl methacrylate, 2-ethylhexyl(meth)acrylate, benzyl(meth)acrylate, lauryl(meth)acrylate, oleyl(meth)acrylate, palmityl(meth)acrylate, and stearyl(meth)acrylate may be mentioned.

In addition, as the vinyl monomer, a difunctional vinyl monomer may also be used. As the difunctional vinyl monomer, for example, divinylbenzene, allyl methacrylate, ethylene glycol dimethacrylate, 1,3-butanediol dimethacrylate, diethylene glycol dimethacrylate, and trimethylolpropane trimethacrylate may be mentioned. In addition, when the above monofunctional vinyl monomer and the above difunctional vinyl monomer are copolymerized to form a highly cross-linked state, hollow resin particles can be obtained that have various features, such as heat resistance, solvent resistance, and solvent dispersibility, as well as the light scattering properties.

As the surfactant, any surfactants that form molecular aggregates, such as micelles, in water may be used, and for example, an anionic surfactant, a nonionic surfactant, a cationic surfactant, and an amphoteric surfactant may be mentioned.

As the polymerization initiator, a known water-soluble compound may be used, and for example, hydrogen peroxide and potassium persulfate may be mentioned.

As the aqueous dispersion medium, for example, water and water containing a hydrophilic organic solvent may be mentioned.

2. Polyurethane Resin

In this invention, as the polyurethane resin, a polycarbonate-based or a polyether-based anionic polyurethane resin is used.

A polyurethane resin having the structure as described above may be formed using a known method, and for example, the polyurethane resin can be obtained by reaction between a compound having at least two isocyanate groups and a compound having at least two active hydrogen groups. The compound having at least two active hydrogen groups is a polyether polyol or a polycarbonate polyol.

The compound having at least two isocyanate groups is not particularly limited, and for example, there may be mentioned a chain aliphatic isocyanate, such as tetramethylene diisocyanate, 1,6-hexamethylene diisocyanate, dodecamethylene diisocyanate, trimethylhexamethylene diisocyanate, or lysine diisocyanate; an aliphatic isocyanate having a cyclic structure, such as 1,3-cyclohexylene diisocyanate, 1,4-cyclohexylene diisocyanate, hydrogenated xylylene diisocyanate, isophorone diisocyanate, 4,4'-dicyclohexylmethane diisocyanate, or 3,3'-dimethyl-4,4'-dicyclohexylmethane diisocyanate; or an aromatic diisocyanate, such as 2,4-tolylene diisocyanate, 2,6-tolylene diisocyanate, m-phenylene diisocyanate, p-phenylene diisocyanate, 4,4'-diphenylmethane diisocyanate, 2,4'-diphenylmethane diisocyanate, 2,2'-diphenylmethane diisocyanate, 3,3'-dimethyl-4,4'-bisphenylene diisocyanate, 3,3'-dimethoxy-4,4'-bisphenylene diisocyanate, 3,3'-dichloro-4,4'-bisphenylene diisocyanate, 1,5-naphthalene diisocyanate, 1,5-tetrahydronaphthalene diisocyanate, xylylene diisocyanate, or tetramethylxylylene diisocyanate. These mentioned above may be used alone, or at least two thereof may be used in combination.

As the polyether polyol, a polymer may be mentioned that is formed, for example, by ring-opening polymerization using at least one cyclic ether compound, such as ethylene oxide, propylene oxide, butylene oxide, styrene oxide, tetrahydrofuran, or epichlorohydrine with a compound having an active hydrogen atom functioning as a catalyst. In particular, polyethylene glycol, polypropylene glycol, and polytetramethylene glycol may be mentioned by way of example. These mentioned above may be used alone, or at least two thereof may be used in combination.

As the polycarbonate polyol, for example, there may be mentioned a reaction product between a diol, such as 1,3-propanediol, 1,4-butanediol, 1,6-hexanediol, diethylene glycol, polyethylene glycol, polypropylene glycol, or polytetramethylene glycol and a dialkyl carbonate, such as phosgene or dimethyl carbonate or a cyclic carbonate such as ethylene carbonate. These mentioned above may be used alone, or at least two thereof may be used in combination.

In addition, in order to enable a polyurethane resin to have anionic properties, for example, a monomer having a carboxyl group, a sulfone group, or the like may be introduced. As the monomer as described above, for example, there may be mentioned a monohydroxy carboxylic acid, such as lactic acid; dihydroxy carboxylic acid, such as α,α-dimethylolacetic acid, α,α-dimethylolpropionic acid, or α,α-dimethylolbutylic acid; or a diamino sulfonic acid, such as 3,4-diaminobutane sulfonic acid or 3,6-diamino-2-toluene sulfonic acid.

In general, as the properties of a polyurethane resin, since main chains thereof are moderately bonded to each other by hydrogen bonding, a flexible and tough film structure can be formed. While the fluidity of the polyurethane resin is maintained at a temperature at which a common ink-jet printing is performed (10 to 40° C.), a flexible film structure is formed from the polyurethane resin so as to spread out over a recording medium, and hence the rub-off resistance is improved. In addition, since a medium commonly used for printing application (for example, ink-jet exclusive recording paper "OHP sheet" manufactured by Seiko Epson Corporation) is generally charged positive in many cases, by using an anionic urethane resin is used as a fixing resin of ink, the adhesion is improved by the electrostatic interaction. In addition, since a polyether-based or a polycarbonate-based polyurethane resin is likely to form a highly flexible film as compared to that formed, for example, by a polyester-based polyurethane resin, the rub-off resistance is improved. Furthermore, since being unlikely to be degraded by water, a polyether-based or a polycarbonate-based polyurethane resin is preferably used for an aqueous ink.

In addition, the glass transition temperature (Tg) of the above polyurethane resin is preferably 50° C. or less, more preferably 0° C. or less, and even more preferably −10° C. or less. Although the detailed reason thereof has not been clearly understood, when an image is formed so as to spread out a polyurethane resin having a glass transition temperature of 50° C. or less on a recording medium, the metal compound or the hollow resin particles, functioning as a colorant, can be more tightly fixed on the recording medium. As a result, an image having superior rub-off resistance can be obtained. In particular, when the glass transition temperature of the polyurethane resin is set to 0° C. or less, intermittent printing characteristics are significantly improved, and nozzle missing and the like that occur in ink-jet printing can be suppressed.

In addition, the inventors of the invention found that in the case in which an image is formed in combination of an ink composition including hollow resin particles and another ink composition including a moisturizing agent, that is, for example, in the case in which an image is formed in combination of a white ink composition including hollow resin particles and a color ink composition which is other than white and which includes a moisturizing agent, when a recorded material obtained thereby is stored for a long period of time or is held under high humidity conditions, for example, phenomena occur in which the color hue is degraded and the boundary between a color image and a white image becomes transparent (hereinafter, the latter phenomenon is called "transparency phenomenon" in some cases). The reason for this is believed that when a recorded material is stored for a long period of time or is held under high humidity conditions, the moisturizing agent remaining in the color ink composition absorbs moisture in air and oozes toward a white image, or the moisturizing agent containing moisture moves into a white image, and as a result, the moisturizing agent enters cavities of the hollow resin particles forming a white image. That is, although the hollow resin particles have a shielding effect by light scattering caused by the difference in optical refractive index between the outer shell and the cavity of each hollow resin particle, when the moisturizing agent containing moisture enters the cavities, a white color exhibited by the shielding effect cannot be obtained.

In addition, it was found that according to the ink composition of the invention in which a polycarbonate-based or a polyether-based anionic polyurethane resin is used as the polyurethane resin, since film formation starts on the surface as drying is performed, and a highly flexible film can be formed as compared to that of a polyester-based urethane resin or the like, the moisturizing agent of the color ink composition is prevented from entering the white image at the boundary between the color image and the white image, and hence the hollow resin particles are suppressed from being made transparent.

As the polyurethane resin of the invention, either an emulsion type in which polyurethane resin particles are dispersed in a solvent or a solution type in which polyurethane resin particles are dissolved in a solvent may be used. In addition, the emulsion type may be classified in accordance with its emulsification method into a forced emulsification type and a self-emulsification type, and although both types may be used in this invention, a self-emulsification type is preferably used. Since a self-emulsification type dispersion is superior in film formation properties and moisture resistance to a forced emulsification type dispersion, a film having resistance against moisture can be formed, and a moisturizing agent containing moisture is prevented from entering a white image formed by hollow resin particles from a color ink image.

As the polyurethane resin used in this invention, for example, there may be mentioned a forced emulsification type polyurethane emulsion, such as "TAKELAC (registered trade mark) W-6061" (manufactured by Mitsui Chemicals, Inc.), or a self-emulsification type polyurethane emulsion, such as "TAKELAC (registered trade mark) W-6021" (manufactured by Mitsui Chemicals, Inc.) or "WBR-016U", (polyether manufactured by Taisei Fine Chemical Co., Ltd., Tg=20° C.).

When the above emulsion type is used as the polyurethane resin, the average particle diameter thereof is preferably 50 to 200 nm and more preferably 60 to 200 nm. When the average particle diameter of the polyurethane resin is in the above range, polyurethane resin particles can be uniformly dispersed in an ink composition.

The content (solid component) of the polyurethane resin is, with respect to the total mass of the ink composition, preferably 0.5 to 10 percent by mass and more preferably 0.5 to 5 percent by mass. When the content of the polyurethane resin is more than 10 percent by mass, the reliability (clogging resistance, ejection stability, and the like) may be degraded, and appropriate properties (such as viscosity) as the ink may not be obtained in some cases. On the other hand, when the content is less than 0.5 percent by mass, the fixability of ink on a recording medium is not superior, and an image having superior rub-off resistance cannot be formed.

3. Permeable Organic Solvent

The ink composition of this invention preferably includes at least one selected from an alkanediol and a glycol ether. An alkanediol or a glycol ether improves the wettability to a recording surface of a recording medium or the like and also improves the permeability of ink.

As the alkanediol, a 1,2-alkanediol having 4 to 8 carbon atoms, such as 1,2-butanediol, 1,2-pentanediol, 1,2-hexanediol, 1,2-heptanediol, or 1,2-octanediol, is preferably used. Among those mentioned above, 1,2-hexanediol, 1,2-heptanediol, or 1,2-octanediol, which has 6 to 8 carbon atoms, is more preferable since having significantly high permeability to a recording medium.

As the glycol ether, for example, there may be mentioned a lower alkyl ether of a polyalcohol, such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, dipropylene glycol monomethyl ether, dipropylene glycol monoethyl ether, triethylene glycol monomethyl ether, triethylene glycol monobutyl ether, or tripropylene glycol monomethyl ether. Among those mentioned above, superior recording quality can be obtained when triethylene glycol monobutyl ether is used.

The content of at least one selected from those alkanediols and glycol ethers is, with respect to the total mass of the ink composition, preferably 1 to 20 percent by mass and more preferably 1 to 10 percent by mass.

4. Surfactant

The ink composition of this invention preferably includes an acetylene glycol-based surfactant or a polysiloxane-based surfactant. An acetylene glycol-based surfactant or a polysiloxane-based surfactant improves the wettability to a recording surface of a recording medium or the like and also improves the permeability of ink.

As the acetylene glycol-based surfactant, for example, 2,4,7,9-tetramethyl-5-decyne-4,7-diol, 3,6-dimethyl-4-octyne-3,6-diol, 3,5-dimethyl-1-hexyne-3-ol, or 2,4-dimethyl-5-hexyne-3-ol may be mentioned. In addition, commercially available acetylene glycol-based surfactants may also be used, and for example, Olfine E1010, STG, and Y (manufactured by Nissin Chemical Industry Co., Ltd.) and Surfynol 104, 82, 465, 485, and TG (manufactured by Air Products and Chemicals Inc.) may be mentioned.

As the polysiloxane-based surfactant, a commercially available product may be used, and for example, BYK-347 and BYK-348 (manufactured by BYK Japan KK) may be mentioned.

Furthermore, the ink composition of this invention may also include another surfactant, such as an anionic surfactant, a nonionic surfactant, or an amphoteric surfactant.

The content of the above surfactant is, with respect to the total mass of the ink composition, preferably 0.01 to 5 percent by mass and more preferably 0.1 to 0.5 percent by mass.

5. Polyalcohol

The ink composition of this invention preferably includes a polyalcohol. When the ink composition of this invention is applied to an ink-jet recording apparatus, a polyalcohol can suppress ink from being dried and can prevent clogging of an ink-jet recording head portion by ink.

As the polyalcohol, for example, there may be mentioned ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, or trimethylolpropane.

The content of the polyalcohol is, with respect to the total mass of the ink composition, preferably 0.1 to 30 percent by mass and more preferably 0.5 to 20 percent by mass.

6. Tertiary Amine

The ink composition of this invention preferably includes a tertiary amine. A tertiary amine functions as a pH adjuster and can easily adjust pH of the ink composition.

As the tertiary amine, for example, triethanolamine may be mentioned.

The content of the tertiary amine is, with respect to the total amount of the ink composition, preferably 0.01 to 10 percent by mass and more preferably 0.1 to 2 percent by mass.

7. Solvent and Additives

The ink composition of this invention includes water as a common solvent. As water, purified water or ultrapure water, such as ion exchanged water, ultrafiltration water, reverse osmosis water, or distilled water, is preferably used. In particular, sterilized water obtained by treating the water mentioned above by ultraviolet radiation or by addition of hydrogen peroxide is preferably used since the generation of fungi and/or bacteria can be suppressed for a long period of time.

Whenever necessary, the ink composition of this invention may further include additives, that is, a fixing agent such as water-soluble rosin, a fungicide/antiseptic such as sodium benzoate, antioxidant/UV absorber such as allophanates, a chelating agent, an oxygen absorber, and the like. The additives may be used alone and, of course, at least two thereof may be used in combination.

In addition, the ink composition of this invention may also include another colorant as well as the metal compound and/or the hollow resin particles. As the another colorant, for example, a common pigment or dye may be used.

8. Preparation Method

The ink composition of this invention may be prepared using a known apparatus, such as a ball mill, a sand mill, an attritor, a basket mill, or a roll mill in a manner similar to that for a related pigment ink. For preparation, coarse particles are preferably removed using a membrane filter, a mesh filter, or the like.

When the ink composition of this invention is applied on various recording media, images can be formed. As the recording media, for example, paper, heavy paper, fiber product, sheet or film, plastic, glass, or ceramic may be mentioned.

Application of the ink composition of this invention is not particularly limited, and this ink composition may be applied to various ink-jet recording systems. As the ink-jet recording systems, for example, thermal jet type ink jet, a piezoelectric type ink jet, a continuous ink jet, a roller application, and a spray application system may be mentioned.

[Recorded Material]

The invention can also provide a recorded material on which an image having superior rub-off resistance is formed by the ink composition described above. In addition, particularly, even when the recorded material of the invention on which an image is formed by an ink composition including hollow resin particles as a colorant is stored for a long period of time or is held under high humidity conditions, the hollow resin particles are not made transparent, and hence high quality image can be maintained for a long period of time.

[Recording Method, Recording Apparatus]

The invention can also provide a recording method for performing image recording on a recording medium using the ink composition described above.

This recording method is not particularly limited, and for example, a relief printing system, an intaglio printing system, a planographic printing system, a screen printing system, an electrophotographic recording system, a thermal transfer recording system, and an ink-jet recording system may be mentioned. Among those mentioned above, in particular, a recording method using an ink-jet recording system is preferable.

As the ink-jet recording system, any related known systems may be used, and in particular, by a method for ejecting a liquid droplet using vibration of a piezoelectric element (recording method using an ink-jet head that forms an ink droplet by mechanical deformation of an electrostrictive element) or by a method using thermal energy, superior image recording can be performed.

This invention can also provide a recording apparatus for recording an image by the above-described recording method of the invention.

EXAMPLES

Hereinafter, the invention will be described in detail with reference to examples; however, the invention is not limited thereto.

1. Preparation of White Ink Composition

A metal oxide, hollow resin particles, a resin, an organic solvent, a polyalcohol, a tertiary amine, a surfactant, and ion-exchanged water were mixed together by stirring in accordance with the respective amounts shown in Table 1 and were then filtrated using a metal filter having a pore diameter of 5 μm, followed by performing a deaeration treatment by a vacuum pump, so that ink compositions of Examples 1 to 6 and Comparative Examples 1 to 6 were obtained. In addition, the units of the values described in Examples 1 to 6 and Comparative Examples 1 to 6 shown in Table 1 are percent by mass, and the units of the metal oxide, hollow resin particles, and polyurethane resin particles are each represented in the form of solid component.

As the metal oxide, a commercially available product shown in Table 1 named "NanoTek (R) Slurry" manufactured by C. I. Kasei Co. Ltd. was used. "NanoTek (R) Slurry" was a slurry that included titanium dioxide of an average particle diameter of 36 nm at a solid component ratio of 15%.

As the hollow resin particles, a commercially available product shown in Table 1 named "SX8782 (D)" manufactured by JSR Corporation was used. "SX8782 (D)" was an aqueous dispersion type composition in which particles had an outside diameter of 1.0 μm and an inside diameter of 0.8 μm, and the solid component was 20.5%.

As the fixing resin, the following polyurethane resin was used.

U-1: polycarbonate-based anionic polyurethane resin, Tg=−70° C., average particle diameter=130 μm, self-emulsification type dispersion.

(Synthesis of U-1)

One mole of polycarbonate (number average molecular weight: 2,000) and 0.7 moles of 1,6-hexanediol were dissolved in a solvent (dimethylformamide, DMF) in a reaction vessel equipped with a heater, a stirrer, a thermometer, a cooler, and a dripping device, so that a solution having a concentration of 30% was prepared. Next, after 1.7 moles of 4,4'-diphenylmethane diisocyanate (NCO/OH=1.0) was added, reaction was performed at 100° C. and was continued until the absorption of a free isocyanate group at a wavenumber of 2,270 $cm^{-1}$ in an infrared absorption spectrum disappeared, and as a result, a polyurethane resin solution was obtained. Furthermore, the polyurethane resin solution was dispersed in water by a known method, so that an aqueous polyurethane dispersion U-1 (solid component: 40%) having a viscosity in the range of 20 to 800 (mPa·s/25° C.) was obtained.

U-2: "Leathermin D2020" (polyether-based anionic polyurethane resin manufactured by Dainichi Seika K K, Tg=−30° C., average particle diameter=100 μm, self-emulsification dispersion).

U-3: "WS-5000" (polyester-based anionic polyurethane resin manufactured by Mitsui Chemical Polyurethane Inc., Tg=65° C., average particle diameter=70 μm).

U-4: "W-635" (polycarbonate-based nonionic polyurethane resin manufactured by Mitsui Chemical Polyurethane Inc., Tg=70° C., average particle diameter=150 μm).

U-5: "WBR-601U" (polyester-based anionic polyurethane resin manufactured by Taisei Fine Chemical Co., Ltd., Tg=−30° C.).

U-6: "W-512A6" (polyether-based nonionic polyurethane resin manufactured by Mitsui Chemical Polyurethane Inc., Tg=2° C., average particle diameter≧1,000 μm).

U-7: "Leathermin D-4200" (polyether-based anionic polyurethane resin manufactured by Dainichi Seika K K, self-emulsification dispersion).

U-8: "Leathermin W-100" (polyether-based anionic polyurethane resin manufactured by Dainichi Seika K K, forced emulsification dispersion).

A-1: "UC-3510" (anionic acrylic resin manufactured by Toagosei Co. Ltd., Tg=−50° C.).

SA-1: "UF-5022" (anionic styrene acrylic resin manufactured by Toagosei Co. Ltd., Tg=75° C.).

In addition, "BYK-348" (manufactured by BYK Japan KK) is a polysiloxane-based surfactant.

2. Evaluation Method 2-1 Evaluation of Rub-Off Resistance

The white ink compositions shown in Table 1 were each filled in a black ink chamber of an exclusive cartridge of an ink-jet printer ("PX-G930" manufactured by Seiko Epson Corporation). The ink cartridge thus formed was set in a printer, and a printing test was then performed. Commercially available ink cartridges were used as cartridges other than the black. Since used as dummies and not used for evaluation of this example, these cartridges had no influence on the effect.

Next, the output was performed at a resolution of 720×720 dpi to an ink-jet exclusive recording sheet ("OHP sheet" manufactured by Seiko Epson Corporation). As the printing pattern, a 100% duty solid pattern was used.

In this specification, the "duty" indicates the value obtained by the following equation.

$$duty(\%) = \{actual\ printing\ dot\ number/(longitudinal\ resolution \times lateral\ resolution)\} \times 100$$

(In the above equation, the "actual printing dot number" indicates an actual printing dot number per unit area; the "longitudinal resolution" and "lateral resolution" each indicate the resolution per unit area. In addition, the "100% duty" indicates the maximum ink mass of simple color with respect to a pixel.)

Next, an OHP sheet printed by the white ink composition was dried at room temperature for 1 hour. After the drying, two types of tests, that is, a "rubbing test using nail" and a "rubbing test using nonwoven cloth" were conducted by a test operator. The "rubbing test using nail" is a rubbing test in which a printing surface is flicked by a nail 2 to 3 times. In addition, the "rubbing test using nonwoven cloth" is a rubbing test in which a printing surface is rubbed by a nonwoven cloth (Bemcot Labo manufactured by Asahi Kasei Fibers Corp.) by applying a load corresponding to 200 g. The evaluation standards are as follows.

<Rubbing Test Using Nail>

A: No change is observed on printing surface.

B: Abrasion is observed on printing surface, but no peeling occurs.

C: Printing surface is peeled off.

D: Printing surface is peeled off by a slight contact therewith.

<Rubbing Test Using Nonwoven Cloth>

A: No change is observed on printing surface.

B: Abrasion is observed on printing surface, but no peeling occurs.

C: Printing surface is peeled off.

D: Printing surface is peeled off by slight contact therewith.

2-2 Evaluation of Intermittent Printing Characteristics

An intermittent printing test was performed using an ink-jet printer PX-20000 (trade name, manufactured by Seiko Epson Corporation). After the white ink compositions of Examples 1 to 6 and Comparative Examples 1 to 6 were each filled in a cartridge for this printer, and the cartridges were each fitted to the above printer, it was confirmed that the white ink compositions were normally ejected from all nozzles at a temperature of 32° C. and a humidity of 20%. Subsequently, after continuous printing on a sheet having a width of 44 inches was performed for 30 minutes, ejection was performed from all the nozzles, and the generation of the trajectory deviation of ink droplets and that of the nozzle missing (dot missing) were evaluated. The above evaluation was performed for 30 minutes as one set and was repeated 3 times. The evaluation standards are as follows.

AA: No nozzle missing occurs by 30 minutes×3 sets, and no trajectory deviation occurs.

A: No nozzle missing occurs by 30 minutes×2 sets, and no trajectory deviation occurs.

B: No nozzle missing occurs by 30 minutes×1 set, and no trajectory deviation occurs.

C: Nozzle missing occurs at 30 minutes, or trajectory deviation occurs.

2-3. Evaluation of Change in Color Hue after White and Color Printing

For white printing, the white ink compositions shown in Table 1 were each filled in a black ink chamber of an exclusive cartridge of an ink-jet printer ("PX-G930" manufactured by Seiko Epson Corporation). The ink cartridge thus formed was set in a printer, and a printing test was then performed. For color printing, by using a commercially available ink-jet printer ("PX-G5500" manufactured by Seiko Epson Corporation) and ink set (EPSON IC9CL3337, photo black, mat black, gray, light gray, yellow, cyan, light cyan, magenta, and light magenta), a printing test was performed.

Next, the output was performed at a resolution of 720×720 dpi to an ink-jet exclusive recording sheet ("OHP sheet" manufactured by Seiko Epson Corporation). As the printing pattern, a 100% duty solid pattern was used for both white and color printing.

Printing was performed in such a way that after a color image layer was formed on a medium using a color ink composition other than white, a white image layer was formed on the color image layer using the white ink composition.

The change in color hue of a printed material was evaluated under high humidity conditions. The evaluation standards are as follows. The results are shown in Table 1.

In addition, for measurement of $L^*$ value, a color measurement apparatus, such as Gretag Macbeth Spectroscan and Spectrolino (manufactured by X-Rite Inc.), in which commercially available black was the base was used.

A: After printed material is held at a temperature of 27° C. and a humidity of 35% for 24 hours and is further held at a temperature of 27° C. and a humidity of 65% for 24 hours, decrease in $L^*$ value of color ink of a white+color portion is less than 5.

B: After printed material is held at a temperature of 27° C. and a humidity of 35% for 24 hours and is further held at a temperature of 27° C. and a humidity of 65% for 24 hours, decrease in $L^*$ value of color ink of a white+color portion is in the range of 5 to less than 10.

C: After printed material is held at a temperature of 27° C. and a humidity of 35% for 24 hours and is further held at a temperature of 27° C. and a humidity of 65% for 24 hours, decrease in $L^*$ value of color ink of a white+color portion is 10 or more.

2-4. Evaluation of Transparency Phenomenon at Boundary Portion at White Image Region Side after White and Color Printing For white printing, the white ink compositions shown in Table 1 were each filled in a black ink chamber of an exclusive cartridge of an ink-jet printer ("PX-G930" manufactured by Seiko Epson Corporation). The ink cartridge thus formed was set in a printer, and a printing test was then performed. For color printing, by using a commercially available ink-jet printer ("PX-G5500" manufactured by Seiko Epson Corporation) and ink set (EPSON IC9CL3337, photo black, mat black, gray, light gray, yellow, cyan, light cyan, magenta, and light magenta), a printing test was performed.

Next, the output was performed at a resolution of 720×720 dpi to an ink-jet exclusive recording sheet ("OHP sheet" manufactured by Seiko Epson Corporation). As the printing pattern, a 100% duty solid pattern was used for both white and color printing.

As a printing method, a white image region and a color image region were recorded on a medium so that the boundaries of the two image regions were in contact with each other, and the transparency phenomenon at a boundary portion at a white image region side was evaluated after aging performed at room temperature. The evaluation standards are as follows. The results are shown in Table 1.

In addition, the printing area of each of the white and the color was set to 100 mm×100 mm (width×length). Furthermore, as a method for measuring the degree of the transparency phenomenon, a color measurement apparatus, such as Gretag Macbeth Spectroscan and Spectrolino (manufactured by X-Rite Inc.), in which commercially available black was the base was used to measure the L* value, and a portion at which the L* value decreased from the initial state by 30 or more was regarded as a portion at which the transparency phenomenon occurred.

A: transparency phenomenon occurs on recorded material that is held for 1 month at a place apart from boundary by less than 0.5 mm.

B: transparency phenomenon occurs on recorded material that is held for 1 month at a place apart from boundary by 0.5 to less than 5 mm.

C: transparency phenomenon occurs on recorded material that is held for 1 month at a place apart from boundary by 5 mm or more.

Since Examples 1 to 4 each used a polycarbonate-based or a polyether-based anionic polyurethane resin as a fixing agent, the rub-off resistances thereof were evaluated as A, and in addition, since the glass transition temperature of the polyurethane resin described above was 0° C. or less, the intermittent printing characteristics were also superior.

In addition, it was found that even when the recorded material formed in combination of the white ink composition of Examples 1 or 2 including hollow resin particles as a white colorant and a color ink composition which was other than white and which included a moisturizing agent was stored for a long period of time or was held under high humidity conditions, the hollow resin particles were substantially suppressed from being made transparent, and a high quality image could be maintained for a long period of time. In particular, it was also found that when Examples 1, 2, and 5 in each of which the polyurethane resin functioning as a fixing resin was in the form of a self-emulsification dispersion were compared with Example 6 in which a forced emulsification dispersion was used, the hollow resin particles of Examples 1, 2, and 5 using a self-emulsification dispersion were further suppressed from being made transparent.

According to Comparative Examples 1 and 3 in which an anionic polyurethane resin having no polycarbonate nor polyether structure was used, the rub-off resistance was evaluated as B in both the nail and the cloth tests. In addition, according to Comparative Example 3, although the glass transition temperature was set to 0° C. or less, the intermittent printing characteristics were not so much improved.

| component | Tg (° C.) | Example 1 | Example 2 | Example 3 | Example 4 | Example 5 | Example 6 | Comparative Example 1 | Comparative Example 2 | Comparative Example 3 | Comparative Example 4 | Comparative Example 5 | Comparative Example 6 |
|---|---|---|---|---|---|---|---|---|---|---|---|---|---|
| White hollow resin particles SX8782 (D) | — | 10 | 10 | — | — | 10 | 10 | 10 | 10 | 10 | 10 | 10 | 10 |
| Metal compound Titanium oxide NanoTek (R) Slurry | — | — | — | 10 | 10 | — | — | — | — | — | — | — | — |
| U-1 (anionic polycarbonate) | −70 | 5 | — | 5 | — | — | — | — | — | — | — | — | — |
| U-2 (anionic polyether) | −30 | — | 5 | — | 5 | — | — | — | — | — | — | — | — |
| U-3 (anionic polyester) | 65 | — | — | — | — | — | — | 5 | — | — | — | — | — |
| U-4 (nonionic polycarbonate) | 70 | — | — | — | — | — | — | — | 5 | — | — | — | — |
| U-5 (anionic polyester) | −30 | — | — | — | — | — | — | — | — | 5 | — | — | — |
| U-6 (nonionic polyether) | 2 | — | — | — | — | — | — | — | — | — | 5 | — | — |
| U-7 (anionic polycarbonate/polyether) | — | — | — | — | — | 5 | — | — | — | — | — | — | — |
| U-8 (anionic polyether) | — | — | — | — | — | — | 5 | — | — | — | — | — | — |
| A-1 (anionic acryl) | −50 | — | — | — | — | — | — | — | — | — | — | 5 | — |
| SA-2 (anionic styrene acryl) | 75 | — | — | — | — | — | — | — | — | — | — | — | 5 |
| Glycerin | — | 10 | 10 | 10 | 10 | 10 | 10 | 10 | 10 | 10 | 10 | 10 | 10 |
| 1,2-hexanediol | — | 3 | 3 | 3 | 3 | 3 | 3 | 3 | 3 | 3 | 3 | 3 | 3 |
| Triethanolamine | — | 0.5 | 0.5 | 0.5 | 0.5 | 0.5 | 0.5 | 0.5 | 0.5 | 0.5 | 0.5 | 0.5 | 0.5 |
| BYK-348 | — | 0.5 | 0.5 | 0.5 | 0.5 | 0.5 | 0.5 | 0.5 | 0.5 | 0.5 | 0.5 | 0.5 | 0.5 |
| Ion exchanged water | — | balance | balance | balance | balance | balance | balance | balance | balance | balance | balance | balance | balance |
| Total | — | 100 | 100 | 100 | 100 | 100 | 100 | 100 | 100 | 100 | 100 | 100 | 100 |
| Rub-off resistance (nail) | | A | A | A | A | A | A | B | C | B | C | C | D |
| Rub-off resistance (cloth) | | A | A | A | A | B | B | B | C | B | C | C | D |
| Intermittent printing characteristics 32° C., 20% humidity | | AA | A | AA | A | B | B | C | C | B | C | C | C |
| Change in color hue after white and color printing | | A | B | — | — | A | C | C | B | B | B | C | C |
| Evaluation of transparency phenomenon at boundary portion at white image region side after white and color printing | | A | A | — | — | A | C | B | B | B | B | C | C |

According to Comparative Examples 2 and 4 in which a nonionic polyurethane resin having a polycarbonate or a polyether structure was used, the rub-off resistance was evaluated as C in both the nail and the cloth tests, and the intermittent printing characteristics were also inferior.

According to Comparative Examples 5 and 6 in which an anionic acryl resin and an anionic styrene acryl resin were used, respectively, the rub-off resistance of Comparative Example 5 was evaluated as C in both the nail and the cloth tests, and that of Comparative Example 6 was evaluated as D in both cases. In addition, although the glass transition temperature was set to 0° C. or less, the intermittent printing characteristics were not so much improved.

Furthermore, when the recorded material formed in combination of the white ink composition of each of Comparative Examples 1 to 6 including hollow resin particles as a colorant and a color ink composition which was other than white and which included a moisturizing agent was stored for a long period of time or was held under high humidity conditions, the transparency phenomenon at the boundary at a white image region side and the change in color hue caused thereby were observed.

What is claimed is:

1. An ink composition comprising:
   a polyurethane resin; and
      at least one colorant selected from the group consisting of a metal compound and hollow resin particles, wherein the metal compound is selected from the group consisting of a metal oxide, barium sulfate and calcium carbonate, and
      wherein the polyurethane resin is a polycarbonate-based or a polyether-based anionic polyurethane resin and has a glass transition temperature of 0° C. or less.

2. The ink composition according to claim 1, wherein the ink composition comprises the hollow resin particles.

3. The ink composition according to claim 1, wherein the polyurethane resin is dispersed in the form of particles in a solvent.

4. The ink composition according to claim 1, wherein the polyurethane resin is in the form of a self-emulsification dispersion.

5. The ink composition according to claim 1, wherein the content of the polyurethane resin is 0.5 to 10 percent by mass.

6. The ink composition according to claim 2, wherein the hollow resin particles have an average particle diameter of 0.2 to 1.0 μm.

7. The ink composition according to claim 2, wherein the content of the hollow resin particles is 5 to 20 percent by mass.

8. The ink composition according to claim 1, further comprising at least one compound selected from the group consisting of an alkanediol and a glycol ether.

9. The ink composition according to claim 1, further comprising an acetylene glycol-based surfactant or a polysiloxane-based surfactant.

10. An ink jet recording system comprising the ink composition according to claim 1.

11. A recorded material having an image formed by depositing the ink composition according to claim 1 onto a recording medium.

12. A recording method for recording an image comprising depositing the ink composition according to claim 1 onto a recording medium.

13. The recording method according to claim 12, wherein the ink composition is deposited onto the recording medium by an ink jet recording apparatus.

14. The ink composition according to claim 1, wherein the ink composition comprises the metal compound.

15. The ink composition according to claim 14, wherein the metal compound comprises a metal oxide.

16. The ink composition according to claim 15, wherein the metal oxide is titanium oxide.

17. The ink composition according to claim 14, wherein the metal compound is barium sulfate.

18. The ink composition according to claim 14, wherein the metal compound is calcium carbonate.

19. The ink composition according to claim 1, wherein the polyurethane resin is dissolved, not dispersed, in a solvent.

20. An ink set comprising (a) the ink composition according to claim 4 comprising the hollow resin particles, and (b) another ink composition, the other ink composition comprising a colorant other than white and a moisturizing agent.

* * * * *